United States Patent [19]

Inui et al.

[11] Patent Number: 5,717,053
[45] Date of Patent: Feb. 10, 1998

[54] CO-CONDENSATION PRODUCT AND RUBBER COMPOSITION CONTAINING THE SAME

[75] Inventors: Naoki Inui, Yamatokoriyama; Hideo Nagasaki, Osaka; Manji Sasaki, Nishinomiya; Kazuaki Yamamoto, Toyonaka; Hironobu Iyama, Ibaraki, all of Japan

[73] Assignee: Sumitomo Chemical Company, Limited, Osaka, Japan

[21] Appl. No.: 410,206

[22] Filed: Mar. 24, 1995

Related U.S. Application Data

[63] Continuation of Ser. No. 167,195, Dec. 16, 1993, abandoned.

[30] Foreign Application Priority Data

| Dec. 17, 1992 | [JP] | Japan | 4-337150 |
| Dec. 17, 1992 | [JP] | Japan | 4-337151 |
| Dec. 17, 1992 | [JP] | Japan | 4-337152 |
| Sep. 13, 1993 | [JP] | Japan | 5-227492 |

[51] Int. Cl.$^6$ .................................................. C08G 59/06
[52] U.S. Cl. .......................... 528/87; 528/212; 528/218; 525/135; 525/139; 525/140; 525/191; 525/332.5; 525/333.1; 525/333.3; 525/333.4; 156/335
[58] Field of Search .................... 525/138, 139, 525/140, 191, 332.5, 333.1, 333.3, 333.4; 528/87, 212, 218; 156/335

[56] References Cited

U.S. PATENT DOCUMENTS

| 2,746,898 | 5/1956 | Buckwater et al. | 154/139 |
| 3,596,696 | 8/1971 | Freytag et al. | 152/330 |
| 3,963,652 | 6/1976 | Tanimura et al. | 260/3 |
| 4,257,926 | 3/1981 | Tanimura et al. | 525/135 |
| 4,465,807 | 8/1984 | Giller et al. | 525/139 |
| 5,030,692 | 7/1991 | Durairaj | 525/134 |

FOREIGN PATENT DOCUMENTS

| 1573947 | 7/1969 | France. | |
| 2355054 | 1/1978 | France. | |
| 2537656 | 2/1977 | Germany. | |
| 57-126643 | 8/1982 | Japan. | |
| 58-61136 | 4/1983 | Japan. | |
| 1163594 | 9/1969 | United Kingdom | C08C 11/52 |

OTHER PUBLICATIONS

*Patent Abstracts of Japan*, vol. 6, No. 224 (M–170), 9 Nov. 1982 & JP-A-57 126 643 (Sumitomo K.K.K.) 6 Aug. 1982.

*Primary Examiner*—Duc Truong
*Attorney, Agent, or Firm*—Watson Cole Stevens Davis, P.L.L.C.

[57] ABSTRACT

There is provided a co-condensation product obtainable by subjecting a p-alkylphenol to reaction with formaldehyde in the presence of an alkali catalyst to prepare a resol type condensate, and subjecting the resulting resol type condensate to reaction with a m-substituted phenol such as resorcin in the presence of an acid catalyst, wherein the content of the m-substituted phenol is not higher than 4% by weight, and the content of a component having a molecular weight not higher than 1,000 excluding both the p-alkylphenol and the m-substituted phenolis at least 25% by weight based on the total weight of the co-condensation product. This co-condensation product is low in fuming and in hygroscopic properties, exhibits excellent adhesiveness in vulcanizing adhesion between rubber and a reinforcing material, and further provides a vulcanized rubber article of high hardness.

24 Claims, No Drawings

CO-CONDENSATION PRODUCT AND RUBBER COMPOSITION CONTAINING THE SAME

This application is a continuation of application Ser. No. 08/167,195, filed Dec. 16, 1993, now abandoned.

This invention relates to a co-condensation product obtained by co-condensing a p-alkylphenol and a m-substituted phenol with formaldehyde and to the use thereof as rubber chemicals. More particularly, this invention relates to a co-condensation product which exhibits substantially no fuming or hygroscopicity and imparts high adhesion properties and high hardness when it is used in vulcanizing adhesion between rubber and a reinforcing material, and to a rubber composition containing the co-condensation product.

In rubber products such as tires, belts, hoses and the like which require reinforcement with a reinforcing material, adhesion between the rubber and the reinforcing material becomes often a problem. For solving this problem, there have heretofore been known a method comprising treating a reinforcing material with any of various adhesives and a method comprising compounding an adhesive together with other various compounding ingredients in the step of processing the rubber. Among them, the method comprising compounding an adhesive in the step of processing the rubber has been widely adopted because the method makes it possible to firmly adhere the reinforcing material to the rubber during vulcanization whether the reinforcing material is treated with an adhesive or not.

This method is called compounding adhesion and generally comprises incorporating, into rubber during processing, a formaldehyde acceptor and a formaldehyde donor which releases formaldehyde upon heating and adhering the unvulcanized rubber obtained to a reinforcing material during vulcanization. There are a method in which a m-substituted phenol such as resorcin or m-aminophenol is used as the formaldehyde acceptor, a method in which a condensation product of a m-substituted phenol with an aldehyde such as formaldehyde or acetaldehyde is used, and a method in which a condensation product obtained by reacting a m-substituted phenol and another mono-substituted phenol with an aldehyde is used.

Among them, the method in which a m-substituted phenol, particularly resorcin is used as the formaldehyde acceptor has been broadly utilized because it is also effective to enhance the hardness of rubber. However, since resorcin is inferior in dispersibility in rubber, it is necessary to mix it at a high temperature, and hence, the resorcin sublimes remarkably during the high temperature mixing, which is quite undesirable to environment and human health. Hence the use of resorcin is becoming a great social problem. Moreover, in the unvulcanized rubber having resorcin compounded therewith, the resorcin blooms to the rubber surface, and hence, results in a reduction of adhesion between unvulcanized rubbers.

As measures for overcoming the above disadvantages, for example, U.S. Pat. No. 2,746,898, U.S. Pat. No. 3,596,696, GB-A-1,163,594 and others have proposed a condensation product of resorcin with formaldehyde. Such a so-called resorcin resin has been improved to some extent in respect of dispersibility in rubber; however, unreacted resorcin remains in a large amount in the resin and hence problems still exist in the fuming of resorcin and in inferior adhesion due to the blooming of resorcin. In addition, there is such a problem in handling that said resorcin resin tends to deliquesce and hence solidify during storage.

In order to solve the above problems, for example, U.S. Pat. No. 3,963,652, U.S. Pat. No. 4,257,926 and others have proposed a ternary co-condensation product consisting of resorcin, an alkylphenol and formaldehyde, and a mixture of a condensation product of resorcin with formaldehyde and a condensation product of an alkylphenol with formaldehyde. These alkylphenol-containing resorcin resins exhibit adhesiveness and rubber properties equivalent or superior to those obtained with conventional resorcin resins, and have been freed from deliquescence and solidifiability which are the faults of the conventional resorcin resins. However, even in the above alkylphenol-containing resorcin resins, unreacted resorcin still remains to some extent in the resin, and hence, sublimation thereof is a problem in environment and human health, and the adhesion to a reinforcing material and rubber hardness are not necessarily sufficient. Therefore, the solution of these problems has been strongly desired.

In view of such circumstances, the present inventors have made extensive research in order to overcome the disadvantages which exist in conventional resorcin resins and alkylphenol-containing resorcin resins, and have consequently reached this invention.

Accordingly, an object of this invention is to provide a co-condensation product capable of exhibiting high adhesion properties when applied to vulcanizing adhesion between rubber and a reinforcing material and also giving a vulcanized rubber article having high hardness.

Another object of this invention is to provide a co-condensation product which exhibits neither deliquescence nor solidifiability during storage and exhibits substantially no fuming due to unreacted components.

A further object of this invention is to incorporate such a co-condensation product into rubber thereby providing a rubber composition which exhibits substantially no reduction in mechanical properties as well as excellent properties in vulcanizing adhesion to a reinforcing material and also produces a vulcanized rubber article having high hardness.

A still further object of this invention is to provide a method for adhering a reinforcing material to rubber by using such a rubber composition.

Other objects and advantages of this invention will be apparent from the following description.

According to this invention, there is provided a co-condensation product obtainable by subjecting a p-alkylphenol represented by formula (I):

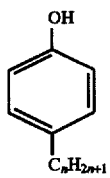

(I)

wherein n is an integer of 1 to 12, to reaction with formaldehyde in the presence of an alkali catalyst to obtain a resol type condensate, and then subjecting the resulting resol type condensate to reaction with a m-substituted phenol represented by formula (II):

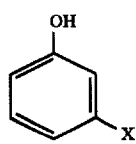

(II)

wherein X is a hydroxyl group, an amino group, an alkylcarbonyloxy group having in total 2 to 5 carbon atoms or an alkoxy group having 1 to 4 carbon atoms, in the presence of an acid catalyst while distilling off water, wherein the content of the m-substituted phenol is 4% by weight or less and the proportion occupied by a component having a molecular weight of 1,000 or less excluding the p-alkylphenol of formula (I) and the m-substituted phenol of formula (II) in the total amount of the co-condensation product is 25% by weight or more.

This invention further provides a rubber composition comprising a rubber selected from the group consisting of natural rubber, styrene-butadiene copolymer rubber, butadiene rubber, isoprene rubber, acrylonitrile-butadiene copolymer rubber, chloroprene rubber, butyl rubber and halogenated butyl rubber and the above-mentioned co-condensation product, and also provides a method for adhering a reinforcing material to rubber by incorporating the above-mentioned co-condensation product into a rubber selected from the above-mentioned group and vulcanizing the rubber blend in contact with the reinforcing material.

In the prior art, there is no illustration to use a co-condensation product comprising mainly a low molecular weight condensate for compounding rubber, and no attention has been paid to the relation between the m-substituted phenol content and the low molecular weight condensate. In particular, when a p-alkylphenol represented by formula (I) and a m-substituted phenol represented by formula (II) are co-condensed with formaldehyde by a generally known method, intention to decrease the amount of the m-substituted phenol represented by formula (II) remaining unreacted causes the resulting condensation product to have a high molecular weight, while intention to obtain the condensation product of a low molecular weight causes the amount of the m-substituted phenol represented by formula (II) remaining unreacted to increase.

In contrast thereto, the characteristic feature of the co-condensation product of this invention lies in that the content of the m-substituted phenol represented by formula (II) is small and that the content of the low molecular weight condensate having a molecular weight of 1,000 or less is large. That is, in this invention, it has been found that the content of the low molecular weight condensate having a molecular weight of 1,000 or less correlates to the adhesiveness between the rubber and the reinforcing material in vulcanizing adhesion and to the hardness of the rubber, and that the larger the content, the higher the effect on the adhesiveness between the rubber and the reinforcing material is shown. However, among the low molecular weight components, the m-substituted phenol represented by formula (II) remaining unreacted exhibits sublimation and blooming when blended with rubber, and the smaller the amount of the unreacted m-substituted phenol, the more preferable the result. Therefore, the great feature of the co-condensation product of this invention lies in that the content of the m-substituted phenol of formula (II) is made small and the content of the low molecular weight condensate is made large.

The p-alkylphenol of formula (I) to be used in the production of the co-condensation product is a para-substituted monoalkylphenol, in which the alkyl group bonded at the para-position has 1 to 12 carbon atoms. Such alkylphenols can be used each alone or in combination of two or more. In view of the fuming, softening point and physical properties of the co-condensation product, preferably used are p-alkylphenols of formula (I) in which n is in the range of 4 to 12, particularly preferably 4 to 9. Preferable p-alkylphenols include specifically p-n-butylphenol, p-t-butylphenol, p-t-octylphenol, p-sec-octylphenol, p-nonylphenol and the like. Particularly preferable are p-t-octylphenol and p-nonylphenol.

A resol type condensate is obtained by reacting such a p-alkylphenol with formaldehyde in the presence of an alkali catalyst. The alkali catalyst used in this reaction is not critical and may be a catalyst used in the production of a conventional resol type condensate, including a hydroxide or carbonate of an alkali or alkaline earth metal, ammonia or an amine. Specific examples of the hydroxide or carbonate of an alkali or alkaline earth metal are sodium hydroxide, potassium hydroxide, calcium hydroxide, sodium carbonate and the like. The formaldehyde may be formaldehyde per. se (formalin which is an aqueous formaldehyde solution), or a compound easily releasing formaldehyde, including paraformaldehyde, trioxane or the like.

The reaction for obtaining the resol type condensate is preferably effected in a solvent. The solvent used may be water or an organic solvent. When the reaction mixture containing a resol type condensate is used as it is in the subsequent reaction with a m-substituted phenol, preferable is a solvent which can be azeotropically distilled with water and easily separated from water, and specific examples thereof include aromatic hydrocarbons such as toluene, xylene, ethyl-benzene, cumene and monochlorobenzene.

The resol type condensate thus obtained is further reacted with a m-substituted phenol of formula (II) in the presence of an acid catalyst while the water produced is removed by distillation. The m-substituted phenol of formula (II) includes, for example, resorcin, m-aminophenol, resorcin monoacetate, resorcin monopropionate, resorcin monobutyrate, resorcin monomethyl ether, resorcin monoethyl ether, resorcin monopropyl ether, resorcin monobutyl ether and the like. These may be used each alone or in combination of two or more. Among them, resorcin is particularly preferable. The acid catalyst used in the above reaction is not critical, and may be, for example, hydrochloric acid, sulfuric acid, nitric acid, phosphoric acid, oxalic acid, p-toluenesulfonic acid and the like.

The above reaction is also preferably effected in a solvent. The solvent used is preferably one which can be azeotropically distilled with water and easily separated from water. Specific examples thereof include aromatic hydrocarbons illustrated above, and toluene is particularly preferable among them.

The mixture obtained from the reaction of the resol type condensate with the m-substituted phenol of formula (II) is then subjected to removal of the solvent, water and the like to separate a co-condensation product. The co-condensation product of this invention is specific one among such co-condensation products, that is to say, one in which the content of the m-substituted phenol of formula (II) remaining unreacted is 4% by weight or less and the proportion occupied by a component having a molecular weight of 1,000 or less excluding the p-alkylphenol of formula (I) and the m-substituted phenol of formula (II) in the total amount of the co-condensation product is 25% by weight or more.

The amount of the m-substituted phenol remaining unreacted in the co-condensation product should be 4% by weight or less in view of sublimation and blooming. The amount of the m-substituted phenol is preferably 3% by weight or less, more preferably 2% by weight or less and further preferably 1% by weight or less. According to this invention, it is sufficiently possible to reduce the content of the m-substituted phenol of formula (II) to 1% by weight or less. On the other hand, the p-alkylphenol of formula (I) remaining unreacted decreases the adhesiveness between rubber and a reinforcing material if it remains too much, and hence, its amount is preferably adjusted to 6% by weight or less, more preferably 2% by weight or less and further preferably 1% by weight or less.

The content of the low molecular weight condensates having a molecular weight of 1,000 or less excluding the p-alkylphenol of formula (I) and the m-substituted phenol of formula (II) is adjusted so as to be 25% by weight or more based on the total weight of the co-condensation product. The content of the low molecular weight condensates has a correlation with adhesiveness in the vulcanizing adhesion between rubber and a reinforcing material and also with the hardness of rubber, and the content smaller than 25% by weight is insufficient for the adhesiveness and the hardness of rubber. The larger the content of the low molecular weight condensates, the higher the adhesiveness and hardness are exhibited, and hence, the content of the low molecular weight condensates is preferably 40% by weight or more.

Among the low molecular weight condensates, a compound having a structure in which one molecule of p-alkylphenol of formula (I) is condensed with two molecules of m-substituted phenol of formula (II) through formaldehyde exhibits an excellent effect on enhancement of adhesiveness between rubber and a reinforcing material. That compound is represented by any one of the following formulas (III), (IV) and (V):

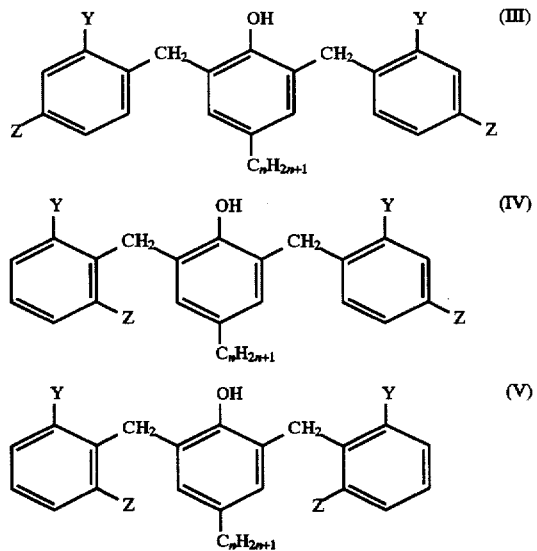

wherein one of Y and Z is a hydroxyl group and the other has the same meaning as X defined above, and n is as defined above.

These compounds have also an effect of enhancing the hardness of rubber. Therefore, among the co-condensation products of this invention, those containing the compounds having formula (III), (IV) and (V) in a total amount of 20% by weight or more based on the total weight of the co-condensation product are preferable. More preferable are those containing the compounds in a total amount of 50% by weight or more, and further preferable are those containing the compounds in a total amount of 80% by weight or more. Incidentally, it is sufficient that at least one of the compounds of formulas (III), (IV) and (V) exists, and the above-mentioned amounts of 20% by weight or more, 50% by weight or more and 80% by weight or more should be interpreted that when only one compound of them exists the amount of this one compound is referred to thereby, when two compounds of them exist the total amount of the two compounds is referred to thereby, and when three or more compounds of them exist the total amount of the three or more compounds is referred to thereby.

In particular, when resorcin is used as the m-substituted phenol represented by formula (II), that is, Y and Z in formulas (III), (IV) and (V) are hydroxyl groups, a high effect can be exhibited. When a co-condensation product containing the compounds represented by formulas (III), (IV) and (V) in a total amount of 20% by weight or more, or further 50% by weight or more, is produced, the amounts of the p-alkylphenol of formula (I) and the m-substituted phenol of formula (II) each remaining unreacted can be reduced by selecting the operation conditions appropriately. It is possible to reduce the contents of the p-alkylphenol of formula (I) and the m-substituted phenol of formula (II) to 2% by weight or less, respectively, and further to 1% by weight or less, respectively.

The co-condensation product of this invention, in general, shows the weight loss on heating of 2% by weight or less when heated at 150° C. for two hours.

The method for producing such a co-condensation product that the content of the m-substituted phenol of formula (II) is small and the content of the low molecular weight component is large is not critical. However, according to a method which has heretofore been generally known, when it is intended to reduce the amount of the m-substituted phenol of formula (II) remaining unreacted, it follows that the condensate has a high molecular weight, whereas when it is intended to allow the condensate to have a low molecular weight, it follows that the m-substituted phenol of formula (II) remains in a large amount.

The co-condensation product of this invention is basically produced in the following three steps (A), (B) and (C):

(A) charging a p-alkylphenol of formula (I) and formaldehyde in such amounts that the molar ratio $M_1$ of the formaldehyde charged to the p-alkylphenol charged becomes 1.5 or more, and subjecting them to reaction in the presence of an alkali catalyst to prepare a resol type condensate;

(B) adding a m-substituted phenol represented by formula (II) to the resol type condensate obtained in the step (A) in such an amount that the molar ratio $M_2$ of the m-substituted phenol charged to the p-alkylphenol-reduced amount of the components resulting from the p-alkylphenol of formula (I) and being present in the resol type condensate becomes 1 or more, and subjecting them to reaction in the presence of an acid catalyst while the water formed is distilled off; and (C) recovering a co-condensation product after the reaction of the step (B).

In these steps, for example, by selecting the molar ratios $M_1$ and $M_2$ appropriately or by adding a step of removing impurities, the desired co-condensation product according to the invention can be produced.

In the step (A) for synthesizing the resol type condensate, first of all, the p-alkylphenol of formula (I) and formaldehyde are charged preferably together with a solvent. To the resulting mixture is added an alkali catalyst, and then, the mixture is subjected to reaction at a temperature of 40°–100° C. to obtain a resol type condensate.

The resol type condensate obtained is a mixture comprising mainly mono- and di-methylol-substituted products of the p-alkylphenol, the unreacted p-alkylphenol and unreacted formaldehyde, but it is preferable to produce the dimethylol-substituted product of the p-alkylphenol in a larger amount herein. In this step, therefore, the molar ratio $M_1$ of the formaldehyde charged to the p-alkylphenol charged is adjusted to 1.5 or more, preferably a value in the range of 1.5 to 4. When the molar ratio $M_1$ of the formaldehyde charged is less than 1.5, the unreacted p-alkylphenol and the mono-methylol-substituted p-alkylphenol remain in large amounts, which is not desirable for the adhesion properties between rubber and a reinforcing material. The upper limit of the molar ratio $M_1$ of the formaldehyde charged is not critical, but the ratio exceeding 4 results in the formation of dimethylol-substituted product saturated and only leaves the excessive formaldehyde unreacted.

As the molar ratio $M_1$ of the formaldehyde charged increases, the amount of formaldehyde remaining unreacted grows large. In particular, when the molar ratio $M_1$ of the formaldehyde charged is not less than 2 or exceeds 2, such problems may occur that the excessive formaldehyde remaining unreacted results in increasing the molecular weight of the co-condensation product and causes scaling the reactor in the subsequent step (B). Therefore, when the resol type condensate synthesized in the step (A) is reacted as it is with the m-substituted phenol of formula (II) in the step (B), the molar ratio $M_1$ of the formaldehyde charged is preferably adjusted to a value in the range of 1.5 to 2.

On the other hand, when the molar ratio of the formaldehyde charged is not less than 2 or exceeds 2, it is preferable to wash the organic layer with water or preferably with an aqueous sodium sulfite solution after the completion of the reaction in the step (A) to remove unreacted formaldehyde, thereby forming a precondensate comprising mainly a dimethylol-substituted p-alkylphenol. Also, in order to obtain a co-condensation product containing a large amount of phenol-trimolecular condensates of the specific structures represented by formulas (III), (IV) and/or (V), it is preferable to crystallize the resol type condensate from an organic solvent after the reaction or after washing the reaction mixture to obtain a product consisting essentially of the dimethylol-substituted product.

In the step (B), the m-substituted phenol of formula (II) is added to the resol type condensate as obtained in the step (A) or the condensate mainly comprising the dimethylol-substituted product obtained by washing or crystallizing the same. They are then subjected to reaction in the presence of an acid catalyst at a pH of 0–6 and at a temperature of 100°–160° C., preferably 110°–160° C. while the water produced is removed by distillation.

The relation between the molar ratio $M_1$ of the formaldehyde charged to the p-alkylphenol of formula (I) used in the synthesis of the resol type condensate and the molar ratio $M_2$ of the m-substituted phenol charged to the p-alkylphenol-reduced amount of the components resulting from the p-alkylphenol in the resol type condensate in the step (B) affects the amounts of the m-substituted phenol of formula (II) and p-alkylphenol of formula (I) remaining in the co-condensation product after the recovery, the amount of a low molecular weight condensate component having a molecular weight of 1,000 or less excluding the p-alkylphenol of formula (I) and the m-substituted phenol of formula (II), the average molecular weight of the co-condensation product and the total amount of the phenol-trimolecular condensates represented by formulas (III), (IV) and/or (V). In particular, when the resol type condensate as obtained in the step (A) is reacted with the m-substituted phenol in the step (B), the relation between $M_1$ and $M_2$ affects the quality of the co-condensed resin obtained.

The molar ratio $M_2$ of the m-substituted phenol charged to the p-alkylphenol-reduced amount of the components resulting from the p-alkylphenol in the resol type condensate referred to herein means the ratio between the molar amount of the m-substituted phenol charged and the molar amount of the unreacted and reacted p-alkylphenol present in the resol type condensate. For example, when the resol type condensate as obtained in the step (A) is used as such in the step (B), the molar ratio $M_2$ means that of the m-substituted phenol of formula (II) used in the step (B) to the p-alkylphenol of formula (I) used in the step (A). When the resol type condensate obtained in the step (A) is divided into two parts and one of the parts is used in the step (B), the molar ratio of the m-substituted phenol of formula (II) to be used in the step (B) is determined depending upon the proportion of the divided part. When the unreacted components and impurities are removed by an operation such as crystallization from the resol type condensate obtained in the step (A), the molar ratio of the m-substituted phenol of formula (II) to be used in the step (B) is calculated based on the amount of the components resulting from the p-alkylphenol of formula (I) and remaining in the resol type condensate.

When the resol type condensate obtained in the step (A) is as such reacted with the m-substituted phenol in the step (B), it is preferable that the molar ratio $M_1$ of the formaldehyde charged in the step (A) is adjusted to a value in the range of 1.5 to 2 and, in the step (B), the m-substituted phenol is added to the resol type condensate obtained so that the molar ratio $M_2$ of the m-substituted phenol charged becomes 1 or more, preferably a value in the range of 1 to 3 and the relation between $M_1$ and $M_2$ satisfies the equation:

$$M_1-M_2 \leq 0.5,$$

and they are subjected to reaction under such conditions.

The upper limit of the molar ratio $M_2$ of the m-substituted phenol charged in the step (B) is not critical, and as far as the unreacted m-substituted phenol is adequately removed in the subsequent step, the increased molar ratio $M_2$ enhances the adhesiveness between rubber and a reinforcing material achieved by blending the co-condensation product obtained with the rubber and simultaneously enhances the hardness of the rubber. However, when $M_2$ exceeds 3, the effect on the enhancement of performance is substantially saturated. When $(M_1-M_2)$ is more than 0.5, the amount of the m-substituted phenol of formula (II) remaining unreacted in the co-condensation product becomes 4% by weight or less, while the molecular weight of the co-condensation product increases, so that the amount of the low molecular weight condensate component having a molecular weight of 1,000 or less excluding the unreacted p-alkylphenol of formula (I) and the unreacted m-substituted phenol of formula (II) becomes lower than 25% by weight in many cases. When the amount of the low molecular weight condensate component is small as mentioned above, the adhesiveness between rubber and a reinforcing material achieved by blending the rubber with the co-condensation product gets insufficient, and besides the softening point of the co-condensation product rises, which results in difficulty to take out the resin from a reaction vessel.

It is also preferable that under the above-mentioned conditions, the molar ratio $M_2$ of the m-substituted phenol charged in the step (B) is adjusted to a value in the range of 1 to 1.5 and the relation between $M_1$ and $M_2$ satisfies the following equation:

$$2 \leq 2M_1-M_2.$$

Adopting such limited conditions produces a co-condensation product having a small amount of the m-substituted phenol remaining unreacted and a large amount of the low molecular weight condensate component. Accordingly, in this case, it is sufficient to remove the solvent and the water in the step (C). When the molar ratio $M_2$ of the m-substituted phenol charged exceeds 1.5 or the value of $(2M_1-M_2)$ is less than 2, the amount of the m-substituted phenol remaining unreacted after the reaction comes large, which necessitates to remove the unreacted m-substituted phenol together with the solvent in the step (C).

On the other hand, when the molar ratio $M_1$ of the formaldehyde charged in the step (A) is adjusted to 2 or more, it is preferable that the mixture after the reaction in the step (A) is washed with water or preferably with an aqueous sodium sulfite solution and then preferably subjected to crystallization to obtain a precondensate comprising mainly dimethylol-substituted p-alkylphenol, and that a m-substituted phenol is added in the step (B) to the precondensate so that the molar ratio $M_2$ of the m-substituted phenol charged becomes 2 or more, preferably a value in the range of 2 to 6 and then they are subjected to reaction. In this case, when $M_2$ is less than 2, the molecular weight of the co-condensation product gets large, and the amount of the low molecular weight condensate component having a molecular weight of 1,000 or less excluding the unreacted p-alkylphenol of formula (I) and the unreacted m-substituted phenol of formula (II) becomes less than 25% by weight in some cases. The upper limit of $M_2$ is not critical, but the ratio exceeding 6 results in the m-substituted phenol of formula (II) excessive, which is uneconomical.

Thus, when the molar ratio $M_1$ of the formaldehyde charged in the step (A) is adjusted to 2 or more and the molar ratio $M_2$ of the m-substituted phenol charged in the step (B) is adjusted to 2 or more, it is possible to produce a co-condensation product comprising mainly the phenol-trimolecular condensates represented by the above-mentioned formulas (III), (IV) and/or (V). In particular, by conducting the water-washing and crystallization after the reaction in the step (A), it is possible to obtain a precondensate comprising substantially dimethylol-substituted alkylphenol and, by adequately conducting the recovery in the step (C), it is possible to produce a co-condensation product consisting essentially of the phenol-trimolecular condensates represented by formulas (III), (IV) and/or (V).

The preferable process for the production of the co-condensation product of this invention, particularly the relation between the molar ratio $M_1$ of the formaldehyde charged in the step (A) and the molar ratio $M_2$ of the m-substituted phenol charged in the step (B) can be summarized as follows:

Adjusting the molar ratio $M_1$ of the formaldehyde charged in the step (A) to 1.5 or more, preferably a value in the range of 1.5 to 4, and the molar ratio $M_2$ of the m-substituted phenol of formula (II) charged in the step (B) to 1 or more, preferably a value in the range of 1 to 6, and within such conditions, (1) adjusting $M_1$ to a value in the range between 1.5 and 2, adding the m-substituted phenol in the step (B) to the resol type condensate obtained in the step (A) so that the molar ratio $M_2$ of the m-substituted phenol charged becomes 1 or more, preferably a value in the range of 1 to 3, holding the relation between $M_1$ and $M_2$ within the following equation:

$$M_1 - M_2 \leq 0.5$$

and allowing them to react, or (2) adjusting $M_1$ to 2 or more, preferably a value in the range of 2 to 4, and after the reaction in the step (A), washing the reaction mixture with water, preferably with an aqueous sodium sulfite solution, and then preferably subjecting the mixture to crystallization to form a precondensate comprising mainly dimethylol-substituted p-alkylphenol, and in the step (B), adding the m-substituted phenol to the precondensate so that the molar ratio $M_2$ of the m-substituted phenol charged becomes 2 or more, preferably a value in the range of 2 to 6, and allowing them to react.

The step (C) is for recovering the co-condensation product. After completion of the reaction in the step (B), when the amount of the unreacted starting materials, particularly the m-substituted phenol remaining unreacted is small, the pressure is reduced to 100 mmHg or lower, preferably 50 mmHg or lower and the reaction mixture is treated at a temperature of 140°–220° C. to remove the solvent and the water formed, thereby recovering the co-condensation product intended by this invention. When the unreacted starting materials remain in a large amount in the reaction mixture, it is preferable to reduce the pressure finally to 10 mmHg or lower, preferably 5 mmHg or lower, and to treat the reaction mixture at a temperature of 180°–220° C., thereby removing the unreacted starting materials, the solvent and the water formed. When the co-condensation product is a resin, the co-condensation resin is solidified by such an operation. Separately from the above operation, it is possible to recover the co-condensation product by removing the free m-substituted phenol of formula (II) through water-washing after completion of the reaction and then by removing the solvent.

Thus, a co-condensation product having a low content of free m-substituted phenol and a large amount of the low molecular weight condensate component can be obtained. It is also possible to obtain a co-condensation product comprising mainly the specific phenol-trimolecular condensates, namely the compounds represented by formulas (III), (IV) and/or (V). If the conditions for reaction and operation are adequately selected, the compound itself represented by formula (III), (IV) or (V) or a mixture consisting essentially of two or more of the compounds can be obtained.

When, after completion of the reaction in the step (A), the dimethylol-substituted p-alkylphenol is isolated and the purification in the step (C) is adequately effected, it is possible to obtain the compounds represented by formula (III), (IV) and/or (V) or a mixture thereof. Unless the isolation or purification is strictly effected as mentioned above, the co-condensation product is obtained in the form of a resin. Since the co-condensation product of this invention has a small content of the remaining m-substituted phenol of formula (II) and a large amount of the low molecular weight condensate component having a molecular weight of 1,000 or less, preferably the compounds represented by formulas (III), (IV) and/or (V), the weight average molecular weight of the co-condensation product is generally 5,000 or less. The lower limit of the molecular weight corresponds to the molecular weight of the compounds of formula (III), (IV) and/or (V). When the co-condensation product is a resin, the average molecular weight of the co-condensation product varies depending upon the number of carbon atoms of the alkyl group in the p-alkylphenol of formula (I) or the kind of the group X in formula (II) for the m-substituted phenol, and generally the weight average molecular weight is 400 or more.

The co-condensation product of this invention is low in fuming and hygroscopicity and gives an excellent adhesion properties in the vulcanizing adhesion between rubber and a reinforcing material, thereby exhibiting an excellent effect when applied to rubber articles, for example, various parts of tires and other rubber products. For example, a rubber composition containing the co-condensation product can be applied to tires, particularly to bead portions or carcass portions which are reinforced with a reinforcing material.

When the co-condensation product is incorporated into rubber, it is added, in general, in an amount ranging from 0.5 to 10 parts by weight, preferably 1 to 4 parts by weight, and more preferably 2 to 4 parts by weight, per 100 parts by weight of the rubber. The parts by weight of the components to be compounded per 100 parts by weight of the rubber is referred to hereinafter as a unit of phr.

The rubber to be applied in this invention can be selected from natural rubber, styrene-butadiene copolymer rubber, butadiene rubber, isoprene rubber, acrylonitrile-butadiene copolymer rubber, chloroprene rubber, butyl rubber and halogenated butyl rubber, and may be composed of a single rubber or a blend of two or more rubbers.

Such a composition comprising the rubber and the co-condensation product is effective particularly in the vulcanizing adhesion between the rubber and a reinforcing material. The reinforcing material to be adhered to the rubber includes, for example, organic fibers such as nylon, rayon, polyester and aramid, and steel cords such as brass-plated steel cords and zinc-plated steel cords. The rubber may be reinforced with any one of these reinforcing materials, and of course may be reinforced with two or more thereof.

In this invention, even merely by incorporating the co-condensation product into rubber, an effect of the co-condensation product is exhibited on the vulcanizing adhesion of the rubber to the reinforcing material, particularly to the steel cords such as brass-plated steel cords and zinc-plated steel cords; however, in order to enhance the adhesiveness sufficiently, it is preferable to add a formaldehyde donor, namely a compound which releases formaldehyde upon heating, which is usually used in the rubber industry.

The formaldehyde donor used herein may be that which has heretofore been used together with resorcin or a resorcin resin of a formaldehyde acceptor, and includes, for example, condensates of melamine and formaldehyde, such as dimethylolmelamine, trimethylolmelamine, tetramethylolmelamine and hexamethylolmelamine; condensates of melamine, formaldehyde and methanol, such as hexakis(methoxymethyl)melamine and pentakis(methoxymethyl)methylolmelamine; hexamethylenetetramine; and the like. When the formaldehyde donor is used, the amount thereof is preferably in the range of 1 to 10 phr, more preferably in the range of 1 to 6 phr.

The rubber composition of this invention may contain a filler, if necessary. The filler may be any of those used usually in the rubber industry, for example, inorganic fillers such as carbon black, silica, clay, calcium carbonate, glass fiber and the like. Among them, carbon black is preferably compounded, and such kinds of carbon black usually used in the rubber industry as SAF, ISAF, HAF, FEF, SRF, GPF, MT and the like may be used. The amount of the filler compounded is preferably in the range of 20 to 150 phr in view of reinforcibility, rubber hardness, heat build-up, dynamic durability and the like. Furthermore, separately from carbon black, or together with carbon black, hydrated silica is preferably compounded for enhancing the adhesiveness. The amount of the hydrated silica to be compounded is preferably in the range of 5 to 40 phr.

In this invention, various rubber chemicals which are usually used in the rubber industry, for example, antidegradants, antioxidants, antiozonants, vulcanizing agents, cross-linking agents, vulcanization accelerators, retarders, peptizers, softening agents, petroleum resins, lubricants, plasticizers, tackifiers and the like, may be additionally used, if necessary.

In particular, in adhering rubber to brass-plated steel cords or zinc-plated steel cords, the additional use of an organic acid cobalt salt such as cobalt naphthenate or cobalt stearate is expected to enhance the adhesiveness, so that such a cobalt salt is preferably used. The amount of the organic acid cobalt salt used is preferably, as an amount of cobalt, in the range of 0.1 to 1 phr.

The rubber composition of this invention thus prepared exhibits an excellent effect on the vulcanizing adhesion between rubber and a reinforcing material. For example, the rubber composition of this invention can be applied to a portion of tires to be reinforced with a reinforcing material, such as bead portion or carcass portion, and subjected to molding and vulcanization in the same manner as conducted usually in the tire industry to produce a tire.

In the vulcanization in contact with a reinforcing material, the vulcanization conditions may vary depending upon the kind of the base rubber and the kind of the compounding ingredients, and the optimum conditions may be adopted. The vulcanization conditions per se may be those which have heretofore been generally adopted and are not critical in this invention.

This invention is further explained in more detail below referring to Examples, which are merely by way of illustration and not by way of limitation. In the Examples, % and parts for expressing the added amount and content are by weight unless otherwise specified.

First of all, Examples showing the production of the co-condensation products of this invention and Comparative Examples showing the production of co-condensation products which are outside the scope of this invention or a resorcin resin are illustrated. In these Examples and Comparative Examples, the amounts of the low molecular weight condensate component having a molecular weight of 1,000 or less contained in the co-condensation products or resins obtained were determined by a gel permeation chromatography (GPC) as follows:

Three "TSK gel 2000 XL" columns manufactured by TOSOH CORP. were used and tetrahydrofuran was used as a solvent. A solution was allowed to flow in the columns at a rate of 0.8 ml/min. and each component peak was isolated by use of an ultraviolet spectrometer (wavelength: 254 nm) as a detector, and the molecular weight was identified by a mass spectrometer. The total sum of the peak areas of the components having a molecular weight of 1,000 or less other than the starting phenols including resorcin and the p-alkylphenol was indicated as the content of the components.

The measurement of the weight average molecular weight was conducted basically according to the above GPC method but using polystyrene as a standard.

EXAMPLE 1

In a four-necked flask equipped with a reflux condenser and a thermometer were placed 103.2 g (0.5 mole) of p-t-octylphenol, 100 ml of toluene and 27.3 g (0.8 mole) of paraformaldehyde having a purity of 88%, and the flask was purged with nitrogen, after which 3.33 g (0.025 mole) of a 30% aqueous sodium hydroxide solution was dropwise added to the resulting mixture. The resulting mixture was subjected to reaction at 70° C. for one hour to obtain 220.6 g of a precondensate.

Subsequently, the reflux condenser was replaced by a fractionator and 66.1 g (0.6 mole) of resorcin and 4.7 g of oxalic acid dihydrate were charged into the flask at 40° C., after which the temperature was elevated to 112° C. and kept at that temperature for two hours while the water and toluene were removed by azeotropic distillation. Subsequently, the pressure was reduced to 50 mmHg and then the temperature was elevated to 150° C. at which temperature concentration was conducted for three hours to obtain 194.5 g of a resorcin p-t-octylphenol resin [A].

Softening point: 103° C.

Free resorcin: 2.3%

Free p-t-octylphenol: 5.8%

Component having molecular weight of 1,000 or less (excluding resorcin and p-t-octylphenol): 34.5%

Weight average molecular weight: 4163

Total amount of compounds of formulas (III), (IV) and (V) ($C_nH_{2n+1}$=t-octyl, X=Y=OH): 12.5%

EXAMPLE 2

The same procedure as in Example 1 was repeated, except that 110.2 g (0.5 mole) of p-nonylphenol was substituted for the p-t-octylphenol, the amount of paraformaldehyde having a purity of 88% was changed to 25.6 g (0.75 mole) and the amount of resorcin was changed to 55.0 g (0.5 mole), to obtain a co-condensation resin [B].

Softening point: 111° C.

Free resorcin: 2.1%

Free p-nonylphenol: 4.5%

Component having molecular weight of 1,000 or less (excluding resorcin and p-nonylphenol): 25.1%

Weight average molecular weight: 2507

Total amount of compounds of formulas (III), (IV) and (V) ($C_nH_{2n+1}$=nonyl, X=Y=OH): 8.5%

EXAMPLE 3

The same procedure as in Example 2 was repeated, except that the amount of the paraformaldehyde having a purity of 88% was changed to 29.9 g (0.875 mole) and the amount of the resorcin was changed to 82.5 g (0.75 mole), to obtain a co-condensation resin [C].

Softening point: 102° C.

Free resorcin: 4.0%

Free p-nonylphenol: 4.2%

Component having molecular weight of 1,000 or less (excluding resorcin and p-nonylphenol): 55.6%

Weight average molecular weight: 1625

Total amount of compounds of formulas (III), (IV) and (V) ($C_nH_{2n+1}$=nonyl, X=Y=OH): 27.5%

EXAMPLE 4

The same procedure as in Example 2 was repeated, except that the amount of the paraformaldehyde having a purity of 88% was changed to 34.1 g (1.0 mole) and the amount of the resorcin was changed to 82.5 g (0.75 mole) to obtain a co-condensation resin [D].

Softening point: 113° C.

Free resorcin: 2.3%

Free p-nonylphenol: 2.1%

Component having molecular weight of 1,000 or less (excluding resorcin and p-nonylphenol): 25.6%

Weight average molecular weight: 4734

Total amount of compounds of formulas (III), (IV) and (V) ($C_nH_{2n+1}$=nonyl, X=Y=OH): 7.9%

EXAMPLE 5

The same procedure as in Example 2 was repeated, except that the amount of the paraformaldehyde having a purity of 88% was changed to 29.9 g (0.875 mole) and the amount of the resorcin was changed to 77.0 g (0.7 mole) to obtain a co-condensation resin [E].

Softening point: 106° C.

Free resorcin: 3.3%

Free p-noylphenol: 4.1%

Component having molecular weight of 1,000 or less (excluding resorcin and p-nonylphenol): 39.5%

Weight average molecular weight: 3036

Total amount of compounds of formulas (III), (IV) and (V) ($C_nH_{2n+1}$=nonyl, X=Y=OH): 16.5%

EXAMPLE 6

In a four-necked flask equipped with a reflux condenser and a thermometer were placed 103.2 g (0.5 mole) of p-t-octylphenol, 100 ml of toluene and 34.1 g (1 mole) of paraformaldehyde having a purity of 88%, and the flask was purged with nitrogen, after which 3.33 g (0.025 mole) of a 30% aqueous sodium hydroxide solution was dropwise added. The resulting mixture was subjected to reaction at 70° C. for two hours to obtain 227.4 g of a pre-condensate.

Thereafter, the reflux condenser was replaced by a fractionator, and 137.6 g (1.25 moles) of resorcin and 4.7 g of oxalic acid dihydrate were placed in the flask at 40° C. The temperature was elevated to 112° C. and kept at that temperature for two hours while the water formed and toluene were removed by azeotropic distillation. Subsequently, the pressure was reduced to 50 mmHg and then the temperature was elevated to 150° C., at which temperature concentration was conducted for one hour. The pressure was further reduced to 3 mmHg, and then, concentration was conducted at 190° C. for two hours to obtain 207 g of a resorcin p-t-octylphenol resin [F].

Softening point: 107° C.

Free resorcin: 0.9%

Free p-t-octylphenol: 0.6%

Component having molecular weight of 1,000 or less (excluding resorcin and p-t-octylphenol): 48.0%

Weight average molecular weight: 1903

Total amount of compounds of formulas (III), (IV) and (V) ($C_nH_{2n+1}$=t-octyl, X=Y=OH): 22.6%

EXAMPLE 7

The same procedure as in Example 6 was repeated, except that the amount of paraformaldehyde having a purity of 88% was changed to 27.3 g (0.8 mole) and the amount of resorcin was changed to 66.1 g (0.6 mole) to obtain 189.7 g of a co-condensation resin [G].

Softening point: 105° C.

Free resorcin: 1.0%

Free p-t-octylphenol: 0.6%

Component having molecular weight of 1,000 or less (excluding resorcin and p-t-octylphenol): 29%

Weight average molecular weight: 3848

Total amount of compounds of formulas (III), (IV) and (V) ($C_nH_{2n+1}$=t-octyl, X=Y=OH): 9.1%

EXAMPLE 8

In a four-necked flask equipped with a reflux condenser and a thermometer were placed 103.2 g (0.5 mole) of p-t-octylphenol and 166.7 g (2.0 moles) of 36% formalin and the flask was then purged with nitrogen, after which 169.5 g (0.5 mole) of a 12% aqueous sodium hydroxide solution was dropwise added. The resulting mixture was subjected to reaction at 50° C. for two hours. The reaction mixture was cooled to room temperature, and then, 60 ml of toluene, 50.7 g (0.5 mole) of 36% hydrochloric acid and 96.4 g of sodium sulfite were added to the mixture with stirring, after which 76.4 g of 36% hydrochloric acid was added thereto with stirring. The resulting mixture was allowed to stand to separate it into two layers. The upper layer (toluene solution) was concentrated and crude crystals precipitated were recrystallized from toluene to obtain 99.0 g of 2,6-bis-(hydroxymethyl)-4-t-octylphenol (purity: 99.1%).

Subsequently, in a four-necked flask equipped with a fractionator and a thermometer were placed 99.0 g (0.37 mole) of the 2,6-bis(hydroxymethyl)-4-t-octylphenol obtained above, 244.2 g (2.22 moles) of resorcin, 4.7 g of oxalic acid dihydrate and 100 ml of toluene, and the temperature was elevated to 112° C., and kept at that temperature for two hours while the water formed and toluene were removed by azeotropic distillation, after which the reaction mixture was concentrated at 150° C. at a reduced pressure of 50 mmHg. After the concentration, the concentrate was cooled to 80° C., and 300 ml of water and 200 ml of toluene were added thereto, after which the resulting mixture was stirred, washed and then allowed to stand to separate it into two layers. The upper layer (toluene solution) was similarly subjected three times to addition of 300 ml of water, water-washing and separation. The solvent was removed by distillation and crude crystals precipitated were recrystallized two times from toluene to obtain 69.9 g of 2,6-bis(2, 4-dihydroxybenzyl)-4-t-octylphenol [H] with white crystals (purity: 98.2%).

Free resorcin: 0.6%

Free p-t-octylphenol: Not detected

Melting point: 196° C.

Molecular weight (mass spectrometry): 450

Elementary analysis: Calcd.: C 74.69%, H 7.55% Found: C 75.02%, H 7.37%

$^1$H-NMR (THF-D8):

0.66 (s, 9H), 1.24 (s, 6H), 1.64 (s, 2H), 3.74 (s, 4H), 4.70 (s, 2H), 6.12 (d-d (7.92 Hz, 2.31 Hz), 4H), 6.83 (d (7.92 Hz), 2H), 6.96 (s, 2H), 7.76 (s, 1H), 7.8–8.6 (br, 2H)

EXAMPLE 9

In a four-necked flask equipped with a fractionator and a thermometer were placed 66.5 g (0.25 mole) of 2,6-bis (hydroxymethyl)-4-t-octylphenol (purity: 99.1%) synthesized in the same manner as in the former half of Example 8, 82.5 g (0.75 mole) of resorcin and 100 ml of toluene, and 36% hydrochloric acid was added thereto so that the pH became 4, after which the temperature was elevated to 112° C. and then kept at that temperature for two hours while the water formed and toluene were removed by azeotropic distillation. The temperature was elevated to 150° C. and the reaction mixture was concentrated at a reduced pressure of 50 mmHg for one hour and then cooled to 80° C., after which 200 ml of toluene and 200 ml of water were added thereto to wash the mixture. The mixture was then allowed to stand to separate it into two layers. The upper layer (toluene solution) was transferred to a still, and then heated to 180° C., at which temperature the toluene solution was distilled at 3 mmHg for two hours to remove the toluene and unreacted resorcin, thereby obtaining a resorcin p-t-octylphenol resin [I].

2,6-Bis(2,4-dihydroxybenzyl)-4-t-octylphenol: 60.2%

2-(2,4-Dihydroxybenzyl)-6-(2,6-dihydroxybenzyl)-4-t-octylphenol: 5.7%

Free resorcin: 0.8%

Free p-t-octylphenol Not detected

Component having molecular weight of 1,000 or less (excluding resorcin and p-t-octylphenol): 78.2%

Weight average molecular weight: 988

COMPARATIVE EXAMPLE 1

In a four-necked flask equipped with a reflux condenser and a thermometer were placed 351 g (1.7 moles) of p-t-octylphenol, 404 ml of toluene and 75.4 g (2.2 moles) of paraformaldehyde having a purity of 88%, and 11.3 g of a 10 N aqueous sodium hydroxide solution was dropwise added thereto at 60° C., after which the resulting mixture was subjected to reaction under reflux for two hours to obtain 789 g of a precondensate.

Thereafter, the reflux condenser was replaced by a fractionator, and 187 g (1.7 moles) of resorcin and 5.4 g of oxalic acid dihydrate were placed in the flask, after which the temperature was elevated. Water and toluene were removed by azeotropic distillation to a cooled separatory vessel. The toluene separated therein was returned to the flask and the water separated therein was taken out of the reaction system to complete the removal of the water. Subsequently, the pressure in the flask was reduced to 30 mmHg and then the temperature was elevated to 150° C., after which the contents in the flask were concentrated for one hour to obtain 568 g of a resorcin p-t-octylphenol resin [R].

Softening point: 118° C.

Free resorcin: 12.5%

Free p-t-octylphenol: 5.7%

Component having molecular weight of 1,000 or less (excluding resorcin and p-t-octylphenol): 17.3%

Weight average molecular weight: 10384

Total amount of compounds of formulas (III), (IV) and (V) ($C_nH_{2n+1}$=t-octyl, X=Y=OH): 4.0%

COMPARATIVE EXAMPLE 2

The same procedure as in Comparative Example 1 was repeated, except that the amount of p-t-octylphenol was changed to 103.2 g (0.5 mole), the amount of the paraformaldehyde having a purity of 88% was changed to 27.3 g (0.8 mole) and the amount of resorcin was changed to 55.0 g (0.5 mole) to obtain a co-condensation resin [S].

Softening point: 139° C.

Free resorcin: 0.6%

Free p-t-octylphenol: 12.6%

Component having molecular weight of 1,000 or less (excluding resorcin and p-t-octylphenol): 19.0%

Weight average molecular weight: 9327

Total amount of compounds of formulas (III), (IV) and (V) ($C_nH_{2n+1}$=t-octyl, X=Y=OH): 4.5%

COMPARATIVE EXAMPLE 3

In a four-necked flask equipped with a reflux condenser and a thermometer were placed 110 g (1.0 mole) of resorcin and 44.5 g (0.55 mole) of 37% formalin, and the resulting mixture was subjected to reaction at 70° C. for five hours. The reflux condenser was then replaced by a fractionator, and the pressure in the flask was reduced to 25 mmHg, after which the temperature was elevated to 150° C., at which temperature the contents of the flask were concentrated for three hours to obtain a resorcin formaldehyde resin [T].

Softening point: 95° C.

Free resorcin: 13.9%

Component of molecular weight of 1,000 or less (excluding resorcin): 77.4%

Examples of evaluating the co-condensation products or resins obtained in Examples 1 to 9 and Comparative Examples 1 to 3 are shown below.

EXAMPLE 10

The co-condensation products or resins obtained in Examples 1 to 9 and Comparative Examples 1 to 3 were tested for hygroscopicity by the following method:

A test sample was ground in a mortar to not less than 400 mesh and 5 g of the ground sample was exactly weighed and then scattered uniformly on a petri dish. This petri dish was placed in a thermo-hygrostat at a temperature of 40° C. and at a relative humidity of 80%, and the change of water content in the sample and the change of solidified state of the sample with the lapse of time were observed. The water content was measured by the Karl Fischer method. The solidified state was evaluated in the following four grades:

I: No change from the state before the test was observed.

II: A little stickiness was observed.

III: Considerable stickiness was observed.

IV: Solidification and stickiness were observed.

The test results obtained are shown in Table 1, from which it can be seen that the co-condensation product of this invention has a smaller hygroscopicity than the resins of the Comparative Examples.

TABLE 1

|  | Sample |  | Before test | 6 hrs | 12 hrs | 24 hrs | 48 hrs |
|---|---|---|---|---|---|---|---|
| Present Invention | A | Water content | 0.8% | 0.9% | 1.1% | 1.3% | 1.3% |
|  |  | Solidified state |  | I | I | I | I |
|  | B | Water content | 0.7% | 0.8% | 1.0% | 1.2% | 1.2% |
|  |  | Solidified state |  | I | I | I | I |
|  | C | Water content | 0.7% | 0.9% | 1.2% | 1.4% | 1.6% |
|  |  | Solidified state |  | I | I | I | I |
|  | D | Water content | 0.7% | 0.9% | 1.1% | 1.2% | 1.3% |
|  |  | Solidified state |  | I | I | I | I |
|  | E | Water content | 0.8% | 1.0% | 1.1% | 1.3% | 1.5% |
|  |  | Solidified state |  | I | I | I | I |
|  | F | Water content | 0.2% | 0.2% | 0.3% | 0.4% | 0.6% |
|  |  | Solidified state |  | I | I | I | I |
|  | G | Water content | 0.4% | 0.4% | 0.5% | 0.6% | 0.8% |
|  |  | Solidified state |  | I | I | I | I |
|  | H | Water content | 0.0% | 0.0% | 0.1% | 0.1% | 0.1% |
|  |  | Solidified state |  | I | I | I | I |
|  | I | Water content | 0.1% | 0.1% | 0.2% | 0.2% | 0.3% |
|  |  | Solidified state |  | I | I | I | I |
| Comparison | R | Water content | 1.1% | 2.4% | 2.7% | 2.9% | 3.1% |
|  |  | Solidified state |  | II | II | III | IV |
|  | S | Water content | 0.7% | 1.0% | 1.1% | 1.2% | 1.2% |
|  |  | Solidified state |  | I | I | I | I |
|  | T | Water content | 1.5% | 5.2% | 5.7% | 6.3% | 7.0% |
|  |  | Solidified state |  | IV | IV | IV | IV |

EXAMPLE 11

Using the resins obtained in Examples 1 to 5 and Comparative Examples 1 to 3, and besides using resorcin for comparison, the adhesion properties between natural rubber and untreated nylon cord were examined, and also, the physical properties of the natural rubber blended with each of the resins or resorcin were examined.

TABLE 2

| Compounding recipe |  |
|---|---|
| Natural rubber (RSS #1) | 100 parts |
| HAF carbon black (N330) | 40 parts |
| Stearic acid | 3 parts |
| Hydrated silica (Nipsil VN3 manufactured by Nippon Silica Kogyo) | 10 parts |
| Zinc oxide | 5 parts |
| Antioxidant (N-phenyl-N'-1,3-dimethylbutyl-p-phenylenediamine) | 2 parts |
| Sample resin or compound | Shown in Table 3 |
| Vulcanization accelerator (N,N-dicyclohexyl-2-benzothiazolesulfenamide) | 1 part |
| Sulfur | 2 parts |
| Methoxylated methylolmelamine resin (Sumikanol 507 manufactured by Sumitomo Chemical Co., Ltd.) | Shown in Table 3 |

A 250-ml Laboplastomill manufactured by Toyo Seiki Seisakusho was used as a Banbury mixer and to natural rubber were added carbon black, stearic acid, hydrous silica, zinc oxide, antioxidant and sample resin or compound according to the above compounding recipe at an oil bath temperature of 150° C., and they were kneaded at a mixer revolution rate of 50 rpm. The temperature of the rubber at this time was 160°–170° C.

Subsequently, the compounded rubber obtained was transferred to an open mill, then the vulcanization accelerator, sulfur and methoxylated methylolmelamine resin shown in Table 3 were added thereto, and the resulting mixture was kneaded. After the kneading, a part of the test sample was subjected to a Mooney scorch test and from the remaining test sample, a test piece in which untreated nylon cord was embedded was prepared for an adhesiveness test and vulcanized at 145° C. for 40 minutes by means of a vulcanizing press. Also, a test piece for a tensile properties test and a test piece for a hardness test were vulcanized at 145° C. for 40 minutes. The respective tests were conducted by the following methods and the results obtained were shown in Table 3.

Mooney scorch

The rubber compound before vulcanization was subjected to Mooney scorch test according to JIS K 6300 to determine the time required for raising 5 points from the lowest value at 125° C., and this time was indicated as scorch time.

Adhesiveness

The rubber compound before vulcanization was vulcanized in contact with untreated nylon cord, and the adhesiveness at that time was evaluated by the H test method described in ASTM D 2138. The result of the adhesiveness test was indicated by the average value of 12 test pieces. The untreated nylon cord used was 1890 d/2.

Tensile properties

Using dumbbell No. 3 test pieces according to JIS K 6301, tensile strength, elongation at break and $M_{300}$ as tensile stress were measured.

Hardness

According to JIS K 6301, a right cylinder-shaped sample having a thickness of 12.7 mm and a radius of 14.5 mm was used to measure hardness by a spring type hardness tester (A type).

TABLE 3

| | Compounding (parts) | | | Scorch | Adhesion to untreated |
|---|---|---|---|---|---|
| | Sample resin or compound | | Melamine | time ($ML_s$) | nylon cord |
| | Kind | Amount | resin | (min) | (kg) |
| Present invention | A | 2 | 4 | 25.3 | 8.5 |
| | B | 2 | 4 | 25.7 | 8.0 |
| | C | 2 | 4 | 24.2 | 9.2 |
| | D | 2 | 4 | 26.5 | 8.2 |
| | E | 2 | 4 | 27.5 | 8.1 |
| Comparison | None | — | — | 27.1 | 2.5 |
| | R | 2 | 4 | 26.3 | 7.7 |
| | S | 2 | 4 | 25.2 | 6.9 |
| | T | 2 | 4 | 20.9 | 7.1 |
| | Resorcin | 2 | 4 | 21.2 | 5.9 |

| | Tensile property | | | |
|---|---|---|---|---|
| | Tensile strength ($kgf/cm^2$) | Elongation at break (%) | $M_{300}$ ($kgf/cm^2$) | Hardness |
| Present invention | 235 | 477 | 131 | 70 |
| | 238 | 490 | 133 | 71 |
| | 246 | 504 | 129 | 71 |
| | 242 | 483 | 132 | 71 |
| | 245 | 493 | 130 | 70 |
| Comparison | 261 | 541 | 121 | 64 |
| | 234 | 477 | 133 | 68 |
| | 233 | 481 | 134 | 67 |
| | 226 | 447 | 130 | 67 |
| | 244 | 500 | 127 | 77 |

Note: Melamine resin: Methoxylated methylolmelamine resin

EXAMPLE 12

The same procedure as in Example 11 was repeated, except that each of the co-condensation products or resins obtained in Examples 6 to 9 and Comparative Examples 1 to 3 or resorcin for comparison was compounded with rubber according to the compounding recipe shown in Table 4 in place of the compounding recipe in Example 11 to obtain the results shown in Table 5.

TABLE 4

| Compounding recipe | |
|---|---|
| Natural rubber (RSS #1) | 100 parts |
| HAF carbon black (N330) | 45 parts |
| Stearic acid | 3 parts |
| Hydrated silica (Nipsil AQ manufactured by Nippon Silica Kogyo) | 10 parts |
| zinc oxide | 5 parts |
| Antioxidant (N-phenyl-N'-1,3-dimethyl-butyl-p-phenylenediamine) | 2 parts |
| Sample resin or compound | Shown in Table 5 |
| Vulcanization accelerator (N,N-dicyclohexyl-2-benzothiazolesulfenamide) | 1 part |
| Sulfur | 2 parts |
| Methoxylated methylolmelamine resin (Sumikanol 507 manufactured by Sumitomo Chemical Co., Ltd.) | Shown in Table 5 |

TABLE 5

| | Compounding (parts) | | | Scorch | Adhesion to untreated |
|---|---|---|---|---|---|
| | Sample resin or compound | | Melamine | time ($ML_s$) | nylon cord |
| | Kind | Amount | resin | (min) | (kg) |
| Present invention | F | 2 | 4 | 26.9 | 13.6 |
| | G | 2 | 4 | 27.1 | 9.0 |
| | H | 2 | 4 | 21.3 | 18.9 |
| | I | 2 | 4 | 18.3 | 17.0 |
| Comparison | None | — | — | 27.2 | 3.6 |
| | R | 2 | 4 | 26.7 | 7.9 |
| | S | 2 | 4 | 25.3 | 7.0 |
| | T | 2 | 4 | 20.7 | 7.2 |
| | Resorcin | 2 | 4 | 21.0 | 6.2 |

| | Tensile property | | | |
|---|---|---|---|---|
| | Tensile strength ($kgf/cm^2$) | Elongation at break (%) | $M_{300}$ ($kgf/cm^2$) | Hardness |
| Present invention | 252 | 510 | 127 | 74 |
| | 248 | 507 | 125 | 72 |
| | 266 | 434 | 169 | 74 |
| | 259 | 427 | 171 | 73 |
| Comparison | 270 | 552 | 126 | 65 |
| | 237 | 470 | 136 | 68 |
| | 235 | 477 | 131 | 67 |
| | 224 | 454 | 134 | 67 |
| | 246 | 504 | 129 | 77 |

Note: Melamine resin: Methoxylated methylolmelamine resin

The co-condensation product of this invention exhibits small fuming and hygroscopicity and excellent adhesion properties in the vulcanizing adhesion between rubber and a reinforcing material and gives a rubber article of high hardness. That is, the co-condensation product having the specific composition of this invention is freed from the problem of deliquescence and solidification which have not been solved by conventional resorcin resins and also freed from the problem of sublimation due to unreacted resorcin which has not been solved by conventional resorcin resins or alkylphenol-containing resorcin resins, and further contributes to the improvement of adhesiveness between rubber and a reinforcing material.

The rubber composition containing the co-condensation product of the specific composition and the rubber composition further containing a formaldehyde donor exhibit excellent adhesion properties in the vulcanizing adhesion of rubber to a reinforcing material and high hardness and are excellent in that the tensile properties are hardly deteriorated by incorporation of a phenol resin. Accordingly, a high quality product can be obtained by applying the rubber composition to parts to be reinforced with a reinforcing material and effecting adhesion to the reinforcing material during vulcanization of the rubber.

What is claimed is:

1. A co-condensation product obtained by subjecting a p-alkylphenol represented by formula (I)

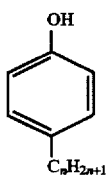

(I)

wherein n is an integer of 1 to 12, to reaction with formaldehyde in the presence of an alkali catalyst to prepare a resol type condensate, when the molar ratio $M_1$ of the formaldehyde charged to the p-alkylphenol charged is 2 or more, and subjecting the resulting resol type condensate to reaction with a m-substituted phenol represented by formula (II):

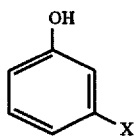

(II)

wherein X is a hydroxyl group, an amino group, an alkylcarbonyloxy group having in total 2 to 5 carbon atoms or an alkoxy group having 1 to 4 carbon atoms, in the presence of an acid catalyst while distilling off water, wherein the molar ratio $M_2$ of the m-substituted phenol charged to the p-alkylphenol is 2 or more, and wherein at least one reaction product having a molecular weight of not higher than 1,000 is formed, said molecular weight being determined by a gel permeation chromatography method using polystyrene as a standard, wherein the content of the m-substituted phenol represented by formula (II) is not higher than 2% by weight, and the proportion occupied by said at least one reaction product in the total amount of the co-condensation product is at least 40% by weight.

2. The co-condensation product according to claim 1, wherein the content of the m-substituted phenol of formula (II) is not higher than 1% by weight.

3. The co-condensation product according to claim 1, wherein the content of the p-alkylphenol of formula (I) is not higher than 6% by weight.

4. The co-condensation product according to claim 3, wherein the content of the p-alkylphenol of formula (I) is not higher than 2% by weight.

5. The co-condensation product according to claim 1, wherein n in formula (I) is 4 to 12.

6. The co-condensation product according to claim 5, wherein n in formula (I) is 4 to 9.

7. The co-condensation product according to claim 1, wherein the p-alkylphenol of formula (I) is p-t-octylphenol or p-nonylphenol.

8. The co-condensation product according to claim 1, wherein the m-substituted phenol of formula (II) is resorcin.

9. The co-condensation product according to claim 1, wherein the at least one reaction product is contained in an amount of at least 40% by weight based on the total weight of the co-condensation product.

10. The co-condensation product according to claim 1, wherein the at least one reaction product comprises at least one compound represented by any one of the formulas (III), (IV) and (V):

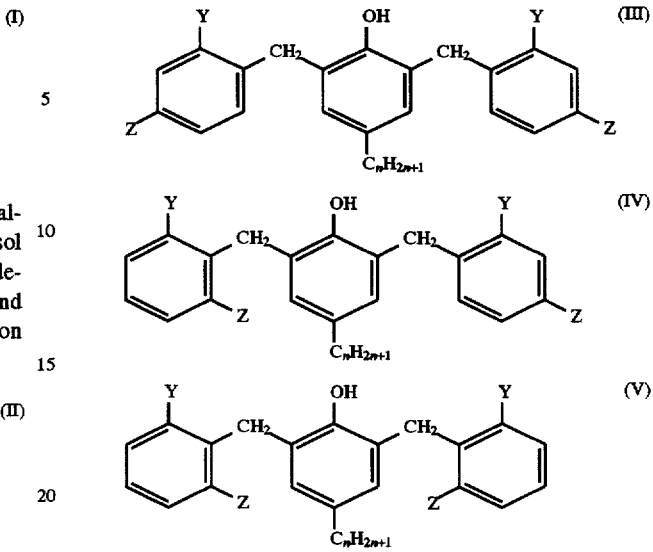

wherein one of Y and Z is a hydroxyl group and the other corresponds to X in formula (if), and n is as defined in claim 1.

11. The co-condensation product according to claim 10, wherein the total amount of the compounds represented by formulas (III), (IV) and (V) is at least 20% by weight.

12. The co-condensation product according to claim 11, wherein the total amount of the compounds represented by formulas (III), (IV) and (V) is at least 50% by weight.

13. The co-condensation product according to claim 12, wherein the total amount of the compounds represented by formulas (III), (IV) and (V) is at least 80% by weight.

14. The co-condensation product according to claim 10, wherein the m-substituted phenol of formula (II) is resorcin, Y and Z both are hydroxyl groups, and the contents of the p-alkylphenol of formula (I) and the m-substituted phenol of formula (II) are not higher than 2% by weight, respectively.

15. The co-condensation product according to claim 10, which consists essentially of at least one of the compounds represented by formulas (III), (IV) and (V).

16. The co-condensation product according to claim 1, which is in the form of a resin having a weight average molecular weight not higher than 5,000, said weight average molecular weight being determined by a gel permeation chromatography method using .polystyrene as a standard.

17. A rubber composition comprising 100 parts by weight of a rubber selected from the group consisting of natural rubber, styrene-butadiene copolymer rubber, butadiene rubber, isoprene rubber, acrylonitrile-butadiene copolymer rubber, chloroprene rubber, butyl rubber and halogenated butyl rubber, and 0.5 to 10 parts by weight of a co-condensation product according to claim 1.

18. The rubber composition according to claim 17, which further comprises 1 to 10 parts by weight of a compound releasing formaldehyde upon heating.

19. The rubber composition according to claim 17, which further comprises 20 to 150 parts by weight of carbon black.

20. The rubber composition according to claim 17, which further comprises 5 to 40 parts by weight of hydrated silica.

21. The rubber composition according to claim 17, which is vulcanized in contact with a reinforcing material.

22. The rubber composition according to claim 21, wherein the reinforcing material is an organic fiber, a brass-plated steel cord or a zinc-plated steel cord.

23. A method for adhering a reinforcing material to a rubber, which comprises incorporating a co-condensation product according to claim 1 into a rubber selected from the group consisting of natural rubber, styrene-butadiene copolymer rubber, butadiene rubber, isoprene rubber, acrylonitrile-butadiene copolymer rubber, chloroprene rubber, butyl rubber and halogenated butyl rubber, and vulcanizing the resulting rubber blend in contact with the reinforcing material.

24. The method according to claim 23, wherein the reinforcing material is an organic fiber, a brass-plated steel cord or a zinc-plated steel cord.

* * * * *